United States Patent [19]
Koike

[11] Patent Number: 6,142,280
[45] Date of Patent: Nov. 7, 2000

[54] OIL PRESSURE CIRCUIT IN A STARTING CLUTCH

[75] Inventor: Yasuhito Koike, Iwata, Japan

[73] Assignee: NSK-Warner K.K., Tokyo, Japan

[21] Appl. No.: 08/892,943

[22] Filed: Jul. 15, 1997

[30] Foreign Application Priority Data

Jul. 16, 1996 [JP] Japan ..................................... 8-186060

[51] Int. Cl.[7] ............................................. F16D 25/0638
[52] U.S. Cl. ................... 192/86; 192/70.12; 192/85 AA; 192/113.34; 192/70.17
[58] Field of Search ................................. 192/85 AA, 86, 192/70.12, 113.3, 113.34, 106 F, 113.36, 70.17, 212

[56] References Cited

U.S. PATENT DOCUMENTS

| | | | |
|---|---|---|---|
| 3,351,169 | 11/1967 | McIndoe | 192/85 R |
| 3,823,802 | 7/1974 | Winzeler et al. | 192/86 X |
| 3,938,631 | 2/1976 | Smith | 192/113.34 X |
| 4,574,926 | 3/1986 | Bubak | 192/70.12 X |
| 4,629,050 | 12/1986 | Valier | 192/113.34 |
| 4,679,677 | 7/1987 | Ohzono et al. | 192/85 AA |
| 4,899,861 | 2/1990 | Cummings, III | 192/113.34 X |
| 5,172,799 | 12/1992 | Ijima et al. | 192/85 AA X |
| 5,542,517 | 8/1996 | Peruski | 192/106 F X |
| 5,755,314 | 5/1998 | Kanda et al. | 192/70.12 |
| 5,813,508 | 9/1998 | Shoji et al. | 192/113.34 |

*Primary Examiner*—Charles A Marmor
*Assistant Examiner*—Ankur Parekh
*Attorney, Agent, or Firm*—Vorys, Sater, Seymour and Pease LLP

[57] ABSTRACT

In order to accurately control the operation between the fastening and liberation of a clutch piston, a cooling oil path and a drain oil path are provided independently of a clutch liberating oil path and a clutch fastening oil path, respectively.

33 Claims, 7 Drawing Sheets

OIL PRESSURE CIRCUIT IN A STARTING CLUTCH

BACKGROUND OF THE INVENTION

1. Field of the Invention

This invention relates to improvements in an oil pressure circuit in a starting clutch for use in an automatic transmission for a vehicle or the like.

2. Related Background Art

As a device located intermediately of an engine and an automatic transmission body, there is known a starting clutch in which one of a torque converter with a lock-up clutch and a clutch piston is controlled by oil pressure and the clutch piston is controlled by a coil spring or the like.

The torque converter with a lock-up clutch cannot be neutrally controlled by itself. Specifically it cannot completely cut off the transmission of power.

In contrast with this is a starting clutch that is located intermediately of an engine and an automatic transmission and that controls the clutch piston by the use of an urging force from oil pressure on the one hand and by an urging force from the reaction force or the like of a coil spring on the other hand. When, in this starting clutch, oil pressure is used for the fastening (engaging) control of the clutch piston, necessary pressure can be supplied with good responsiveness. But when the reaction force of the coil spring is used for the liberating (releasing) control of the clutch piston, it is impossible to vary the set reaction force in itself. Also, in designing, the reaction force for the liberation of the coil spring is usually set to a considerably low value relative to the fastening oil pressure to thereby make the fastening force (=<oil pressure for fastening>–<reaction force of the coil spring>) great.

When the reaction force of the coil spring is set to a low value relative to the oil pressure, even if a clutch piston control valve is in its liberated state, the clutch piston does not actually begin to be liberated, in the process wherein the clutch piston changes from its fastened state to its liberated state, until the fastening pressure drops below the reaction force of the coil spring. That is, even if the clutch piston control valve is in its liberated state, the delay until the fastening pressure becomes below the reaction force of the coil spring retards the timing of clutch liberation, thus resulting in the problem that the shock during the clutch fastening or the amount of transmission of necessary torque cannot be adjusted. Even when the reaction force of the coil spring is provided for the clutch piston fastening and oil pressure is provided for the clutch piston liberation, the delay of the reaction force of the coil spring retards the timing of the clutch fastening as in the aforedescribed case, thus causing various problems.

Figure 1:
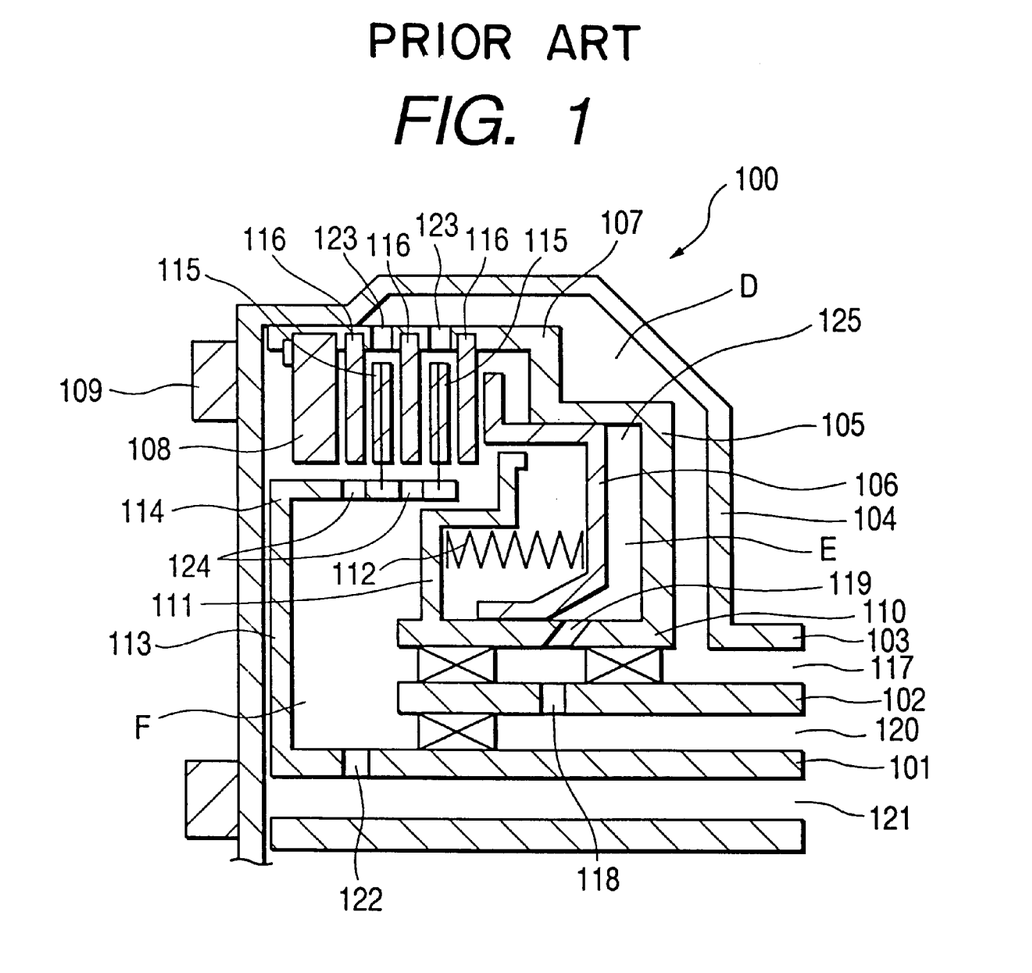
FIG. 1 is a schematic cross-sectional view of a starting clutch according to the prior art.

FIG. 1 of the accompanying drawings is a schematic cross-sectional view showing an example of the prior-art starting clutch for location intermediately of the engine and the automatic transmission, wherein the fastening movement of the clutch piston is effected by oil pressure and liberating movement of the clutch piston is effected by the reaction force of the coil spring.

The starting clutch 100 comprises an input shaft 101 having an axially extending hole and provided with a radially extending hole 122, a fixed shaft 102 provided outside the input shaft 101 and provided with a radially extending hole 118, and a sleeve 103 provided outside the fixed shaft 102. The sleeve 103 is a portion of a housing 104, and a clutch case 105 for the starting clutch 100 is mounted in the housing 104. The clutch case 105 rotates with the housing 104.

A clutch piston 106 is axially slidably disposed in the clutch case 105. A plurality of plates 116 axially slidable through a spline or the like are axially provided at predetermined intervals on the outer peripheral cylindrical portion 107 of the clutch case 105. Also, a fixed plate 108 is fixed to the clutch case 105 outside the plates 116. Also, a projected portion 109 is provided on the back of the housing 104.

A radially outwardly extending flange portion 111 is provided on the inner peripheral cylindrical portion 110 of the clutch case 105, and a coil spring 112 is disposed between the flange portion 111 and the clutch piston 106. The coil spring 112 gives a force in a direction to urge the clutch piston 106 against the inner peripheral surface of the clutch case 105. Further, the inner peripheral cylindrical portion 110 of the clutch case 105 is formed with a radially extending hole 119.

The end portion of the input shaft 10.1 of the starting clutch 100 provides a disc-like hub 113 on the rear side of the housing 104, and an axially extending cylindrical portion 114 is provided radially outwardly of the hub 113 in opposed relationship with the input shaft 101.

A plurality of friction plates 115 of the starting clutch 100 are axially slidably provided at predetermined intervals in the axial direction on the cylindrical portion 114 of the hub 113 through a spline or the like.

The oil path of the starting clutch 100 will now be described. A drain oil path D for cooling oil for cooling the friction surfaces of friction plates 116 having a drain exit 117 between the sleeve 103 and fixed shaft 102 of the starting clutch and the plates 115 is formed between the fixed shaft 102 of the starting clutch 100 and the sleeve 103 of the starting clutch 100.

Likewise, an operating oil path E for operating the clutch piston 106 communicates with the gap 120 between the fixed shaft 102 and the input shaft 101 through a hole 118 in the final shaft and a hole 119 in the inner peripheral cylindrical portion 110 of the clutch.

Further, in communication with a through-aperture 121 in the input shaft 101, there is formed a cooling oil path F for cooling the friction surfaces of the friction plates 115 and plates 116 through a hole 122.

There are a plurality of communication holes 123 in the outer peripheral cylindrical portion 107 of the clutch case 105, and there are provided a plurality of communication holes 124 in the outer peripheral cylindrical portion 114 of the hub 113, and they communicate the drain oil path D and the cooling oil path F with each other through the gaps between the friction plates 115 and the plates 116. The drain oil path D and the cooling oil path F together constitute an oil path exclusively for cooling the friction surfaces.

Description will hereinafter be made of the flow in the friction surface cooling oil path of the prior-art starting clutch 100 of the above-described construction.

The cooling oil passes through the cooling oil path F, i.e., from the through-aperture 121 in the input shaft to the hole 122, toward the friction surface of the starting clutch 100, and flows in a direction to lubricate, i.e., cool, the friction surfaces. This cooling oil flows from the communication holes 123 to the drain exit 117 and is discharged.

If a friction material attached on the friction plates 115 is formed with grooves extending, for example, from the radially inner periphery side to the outer periphery side of the friction material and extending through the friction material, the flow of the cooling oil will become smoother and there will be obtained a greater cooling effect. The number of the grooves can be arbitrarily set, but a plurality of such grooves may preferably be provided in the circumferential direction for the purpose of the smooth flow of the cooling oil.

In contrast, the operating oil path E in the clutch piston 106 of the starting clutch 100 is such that the operating oil flows from the gap 120 between the fixed shaft 102 and the input shaft 101 and through the hole 118 and the hole 119 to thereby raise the oil pressure in an oil pressure chamber 125 and move the clutch piston 106 leftwardly as viewed in FIG. 1 by the oil pressure force. As a result, the friction plates 115 and the plates 116 are fastened to (engaged to) each other between the clutch piston 106 and the fixed plate 108, and the starting clutch 100 becomes fastened and the transmission of power becomes possible. Next, if the oil pressure in the oil pressure chamber 125 is decreased, the clutch piston 106 is rightwardly moved by the reaction force of the coil spring 112 and the friction plates 115 and the plates 116 are separated from each other, and the fastened state of the starting clutch 100 is released and the starting clutch becomes unfastened (disengaged).

Here, the power transmitting route in the prior-art starting clutch will be described. During the fastening of the starting clutch, the power outputted from an engine, not shown, is transmitted to the housing 104 through a drive plate, not shown, and through the projected portion 109 of the housing 104. Next, the power is transmitted to the clutch case 105 of the starting clutch which rotates with the housing 104, and is transmitted to the input shaft 101 of the starting clutch 100 through the plates 116 connected to the clutch case 105 through a spline or the like, and the friction plates 115 and hub 113 urged against the plates 116 by the clutch piston 106. The power transmitted to the input shaft 101 is transmitted to an automatic transmission body, not shown.

Next, during the liberation (release) of the starting clutch 100, the power output from the engine is transmitted to the housing 104 through the drive plate and through the projected portion 109 of the housing 104. Thereafter, the power is transmitted to the clutch case 105 of the starting clutch which rotates with the housing, and is transmitted to the plates 116 connected to the clutch case 105 through a spline or the like. During the liberation of the starting clutch 100, however, the connection between the plates 116 and the friction plates 115 is cut off and therefore, there is no transmission of the power from the plates 116 to the friction plates 115 and the starting clutch 100 assumes a neutral state.

In the prior-art starting clutch described above, when the clutch piston is to be operated by the use of the reaction force of the coil spring, the piston cannot be operated unless the opposing oil pressure becomes below the reaction force of the coil spring. Moreover, the difference between the force Of the coil spring and the force of the fastening oil pressure urging the clutch piston is used as the clutch piston urging force necessary for the fastening of the clutch. Therefore, even if the reaction force (urging force) of the coil spring is strengthened, the fastening oil pressure also becomes higher so that greater pump power is required.

SUMMARY OF THE INVENTION

Accordingly, it is the object of the present invention to provide an oil pressure circuit which is quick and highly accurate in clutch operation and which is independent of the clutch friction surface cooling oil path of a starting clutch.

To achieve the above object, the starting clutch of the present invention is characterized by the provision of an oil pressure circuit capable of quickly and highly accurately controlling the fastening-liberation of the clutch piston of the starting clutch.

Further, to achieve the above object, the present invention provides an oil pressure circuit in a starting clutch for a power transmission mechanism, such as an automatic transmission, comprising an input shaft, a shaft member disposed radially outwardly of the input shaft, a clutch case disposed radially outwardly of the shaft member and containing a clutch portion, a clutch piston and an annular member therein, and housing containing the clutch case therein, the oil pressure circuit comprising:

a cooling oil path defined between a first aperture provided axially in the input shaft and the clutch portion and supplying oil for cooling a friction surface of the clutch portion, a clutch liberating oil path defined from a second inner hole provided radially outwardly of the first inner hole and axially in the input shaft and between the clutch piston and the annular member, and operating the clutch piston, a clutch fastening oil path defined from a gap of the input shaft and the shaft member and between the clutch case and the clutch piston, and operating the clutch piston, and a drain oil path defined between the shaft member and the housing and between the clutch case and the housing, and discharging the cooling oil which has cooled the friction surface, the cooling oil path and the drain oil path being provided independently of the clutch liberating oil path and the clutch fastening oil path, respectively.

According to the present invention, the operation of the clutch piston of the starting clutch is all done by oil pressure control, instead of control in which the operation of the clutch piston is done by oil pressure on the one hand and is done, for example, by the utilization of only the reaction force of a coil spring on the other hand. Thus, without an oil pressure area being limited, the pressure difference of the oil pressure necessary for the operation of the clutch piston of the starting clutch can be arbitrarily and freely set and quick, highly accurate and smooth control becomes possible.

DESCRIPTION OF THE PREFERRED EMBODIMENTS

Some embodiments of the present invention will hereinafter be described.

Figure 2:
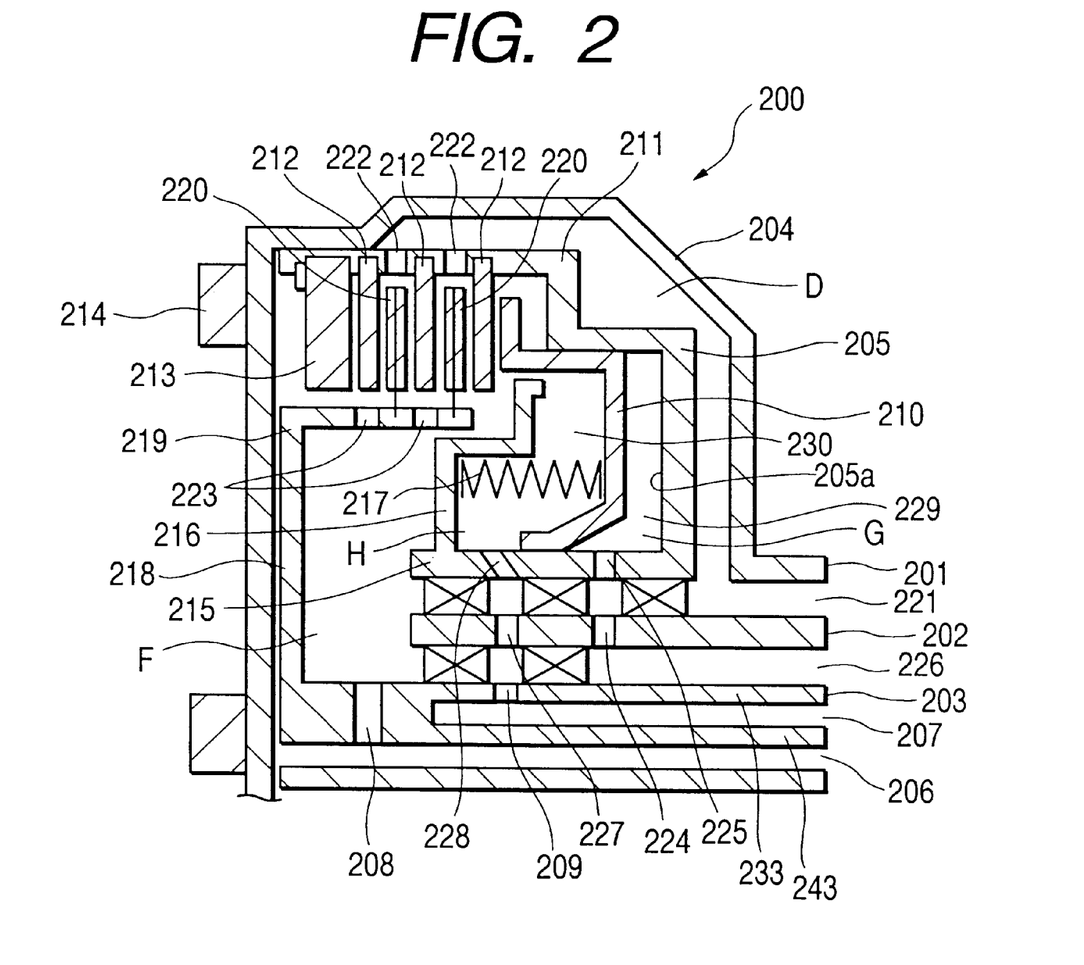
FIG. 2 is a schematic cross-sectional view of an oil pressure vs. oil pressure type starting clutch according to a first embodiment of the present invention.

FIG. 2 is a schematic cross-sectional view of a starting clutch according to a first embodiment of the present invention for disposition intermediately of an engine and an automatic transmission.

The starting clutch 200 comprises a sleeve 201, a fixed shaft 202 provided inside the sleeve 201, and an input shaft 203 provided inside the fixed shaft 202. The sleeve 201 is a portion of a housing 204, and the clutch case 205 of the starting clutch 200 is mounted in the housing 204. The clutch case 205 rotates with the housing 204.

The input shaft 203 has two cylindrical portions 233 and 243 radially outwardly and inwardly thereof, and is formed with two bores axially extending and axially parallel to each other, i.e., a radially inward first bore 206 and a radially outward second bore 207. The first bore 206 and the second bore 207 both open at one end of the input shaft 203. The first bore 206 opens at the other end as well. From the first bore 206, there is provided a hole 208 radially outwardly extending in one end portion of the input shaft 203, from in the second bore 207, there is provided a hole 209 between the input shaft 203 and the fixed shaft 202.

The clutch case 205 has a clutch piston 210 axially slidably disposed therein. A plurality of plates 212 axially slidable through a spline or the like are axially provided in the outer peripheral cylindrical portion 211 of the clutch case 205. Also, axially outwardly of the plates 212, a fixed plate 213 is fixed to the clutch case 205. A projected portion 214 is provided on the back of the housing 204. The inner peripheral cylindrical portion 215 of the clutch case 205 is fitted to the fixed shaft 202 through a bearing. A radially outwardly extending flange portion 216 (annular memnber) is provided on the inner peripheral cylindrical portion 215, and a coil spring 217 is disposed between the flange portion 216 and the clutch piston 210. The coil spring 217 gives a force in a direction to urge the clutch piston 210 against the inner peripheral surface 205a of the clutch case 205.

The end portion of the input shaft 203 of the starting clutch 200 provides a disc-like hub 218 on the rear side of the housing 204, and a cylindrical portion 219 is provided radially outwardly of the hub 218.

On the cylindrical portion 219 of the hub 218, the plurality of friction plates 220 of the starting clutch 200 are axially slidably provided through a spline or the like. In the present embodiment, each of two friction plates 220 is sandwiched between adjacent ones of three plates 212. The friction plates 220 and the plates 212 thus provide, together with the plate 213, a clutch portion contained in the clutch case 205. Of course, the number of plates 212 and the number of the friction plates 220 can be set as suits any particular application. Also, a friction material to be attached on the friction plates can be provided on both or one of the sides thereof.

The oil path of the starting clutch 200 will now be described. A drain oil path D for cooling oil for cooling the friction surfaces of the friction plates 220 and the plated 212 and having a drain exit 221 is formed between the fixed shaft 202 of the starting clutch 200 and the sleeve 201 of the starting clutch 200.

Also, a cooling oil path F for cooling the friction surfaces of the friction plates 220 and the plates 212 is formed from the first inner hole 206 extending through the input shaft 203, through the radially extending hole 208.

There are a plurality of communication holes 222 in the outer peripheral cylindrical portion 211 of the clutch case 205, and there are also formed a plurality of communication holes 223 in the cylindrical portion 219 of the hub 218, and these communication holes communicate the drain oil path D and the cooling oil path F with each other through the gaps between the friction plates 220 and the plates 212. That is, the drain oil path D and the cooling oil path F together constitute an oil path exclusively for cooling the friction surfaces.

There are a radially extending hole 224 and a hole 225 in the fixed shaft 202 and the inner peripheral cylindrical portion 215 of the clutch case 205, respectively and through them, a clutch piston fastening oil path G for clutch fastening is formed from the gap between the input shaft 203 and the fixed shaft 202.

Likewise, there are radially extending holes 209, 227 and 228 in the input shaft 203, the fixed shaft 202 and the inner peripheral cylindrical portion 215 of the clutch case, respectively, and through them, a clutch piston liberating oil path H for clutch liberation is formed from the second inner hole 207 not extending through the input shaft 203.

Description will now be made of the flow in the clutch piston operation oil path of the starting clutch 200 constructed as described above. The fastening oil path G for the clutch piston 210 of the starting clutch 200 passes from the gap 226 between the input shaft 203 and the fixed shaft 202 and through a hole 224 and a hole 225 toward an oil pressure chamber 229. When the starting clutch 200 is to be fastened, the oil pressure of this oil pressure chamber 229 is raised and, conversely, the oil pressure of an oil pressure chamber 230 is made lower than that, whereby the clutch piston 210 is moved leftwardly as viewed in FIG. 2. As a result, the friction plates 220 and the plates 212 are fastened to each other between the clutch piston 210 and the fixed plate 213, and the starting clutch 200 becomes fastened and the transmission of power becomes possible.

The liberating oil path H for the clutch piston 210 of the starting clutch 200 passes from the second inner hole 207 not extending through the input shaft 203 and through the hole 209, a hole 227 and a hole 228 toward the oil pressure chamber 230. If the oil pressure of the oil pressure chamber 229 is decreased and the oil pressure of the oil pressure chamber 230 is raised, the clutch piston 210 will be moved rightwardly as viewed in FIG. 2 and the friction plates 220 and the plates 212 will be separated from each other, and the fastened state of the starting clutch 200 will be released and the starting clutch will become non-fastened. Additionally the coil spring 217 is provided in the oil pressure chamber 230, whereby it is also possible to use the reaction force thereof jointly with the oil pressure when the starting clutch is to be brought into its non-fastened state.

The flow of the cooling oil in the present first embodiment and a second embodiment which will be described later is substantially similar to that described in relation to FIG. 1 and therefore need not be described here.

Description will now be made of the power transmitting path of the starting clutch 200 according to the first embodiment. When the starting clutch 200 is fastened, the power outputted from the engine, not shown, is transmitted to the housing 204 through a drive plate, not shown, and through the projected portion 214 of the housing 204. Next, the power is transmitted to the clutch case 205 of the starting clutch rotated with the housing 204, and is transmitted to the input shaft 203 of the starting clutch 200 through the plates 212 connected to the clutch case 205 through a spline or the like, and the friction plates 220 on hub 218, which are urged against the plates 212 by the clutch piston 210. The power transmitted to the input shaft 203 is transmitted to an automatic transmission body, not shown.

Next, when the starting clutch 200 is liberated, the power outputted from the engine is transmitted to the housing 204 through the drive plate and through the projected portion 214 of the housing 204. Thereafter the power is transmitted to the clutch case 205 of the starting clutch rotated with the housing 204, and is transmitted to the plates 212 connected to the clutch case 205 through a spline or the like. During the liberation of the starting clutch 200, however, the connection between the plates 212 and the friction plates 220 is cut off and therefore, there is no transmission of the power from the plates 212 to the friction plates 220 and the starting clutch 200 assumes its neutral state.

The operation of the clutch, i.e., the operation of the clutch piston, will now be described in greater detail. The fastening of the clutch portion is such that when oil is supplied from the gap between the input shaft 203 and the fixed shaft 202 to the oil pressure chamber 229 through the hole 224 and the hole 225 and the oil pressure of the oil pressure chamber 229 rises, the oil pressure force supplied to the oil pressure chamber 230 is lowered at the same time so that the oil pressure of the oil pressure chamber 229 becomes higher than the oil pressure of the oil pressure chamber 230. Consequently the clutch piston 210 moves in the direction toward the oil pressure chamber 230 in which the oil pressure has become low, i.e., the clutch fastening direction (the leftward direction as viewed in FIG. 2).

The liberation of the clutch piston is such that when oil is supplied from the second inner hole 207 to the oil pressure chamber 230 via the hole 209, the hole 227 and the hole 228, whereby the oil pressure rises in chamber 230 the oil pressure supplied to the oil pressure chamber 229 is lowered at the same time so that the oil pressure of the oil pressure chamber 230 becomes higher than the oil pressure of the oil pressure chamber 229. Consequently the clutch piston 210 moves in the direction toward the oil pressure chamber 229 in which the oil pressure has become low, i.e., the clutch liberating direction (the rightward direction as viewed in FIG. 2).

Also, when the oil pressure in the oil pressure chamber 229 is P1 and the oil pressure in the oil pressure chamber 230 can be P2, the pressure difference is arbitrarily set in the state of P1>P2, whereby the degree of positive fastening of the clutch can be set. If P1<P2, the clutch will always be liberated. When P1=P2, the piston will be liberated by an amount corresponding to the reaction force of a coil spring if a coil spring is installed on the P2 side (oil pressure chamber 230). By the pressure difference between the fastening oil pressure and the liberating oil pressure being thus arbitrarily set, the power transmission rate of the starting clutch can be freely controlled from nearly 0% to 100%. Further, by the coil spring being provided on the clutch piston liberating side, the clutch piston will always be liberated by an amount corresponding to the reaction force of the coil spring if oil pressure is not applied to the clutch piston and therefore, it is possible to prevent the vehicle from running out with the starting clutch fastened immediately after the starting of the engine, to prevent an engine failure, or the like.

The oil pressure difference is utilized for the control of the clutch piston and therefore, even if centrifugal oil pressure occurs, for example, on the clutch piston fastening oil pressure side, it is possible to cancel the centrifugal oil pressure by heightening the pressure corresponding to the centrifugal oil pressure on the clutch piston liberating side.

Figure 3:
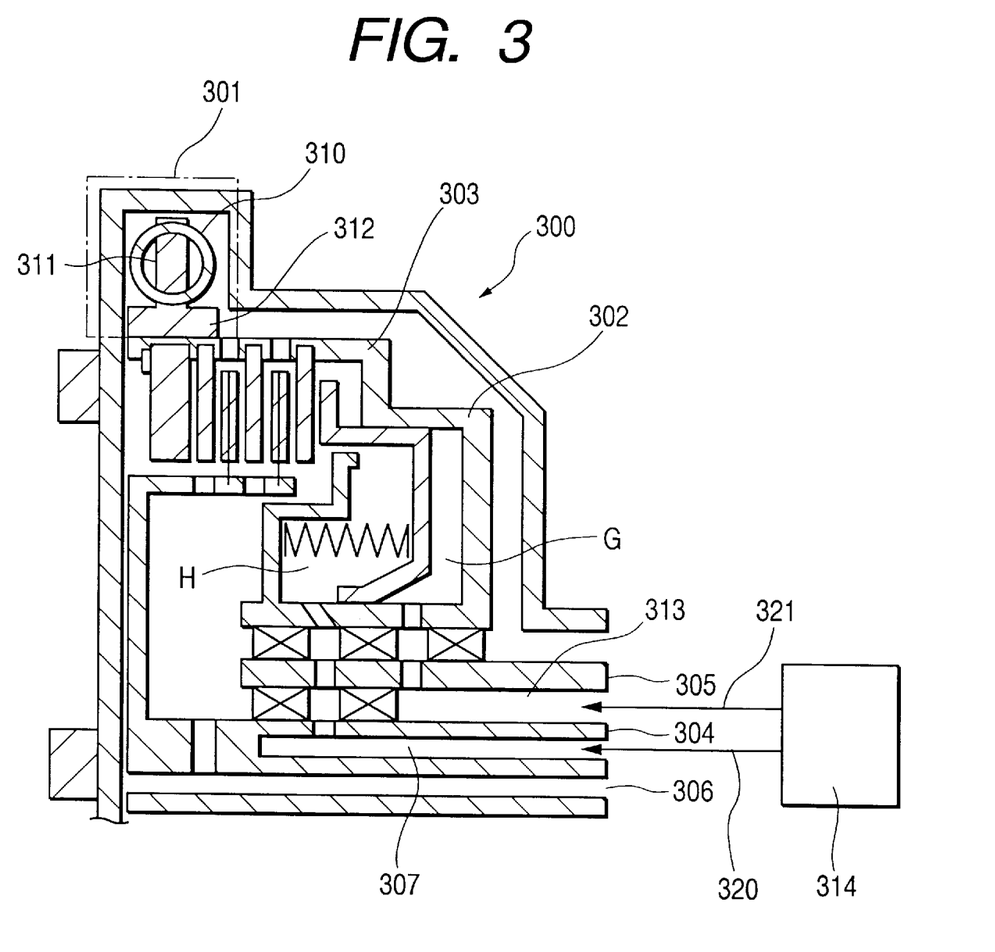
FIG. 3 is a schematic cross-sectional view of a damper integral type starting clutch according to a second embodiment of the present invention.

FIG. 3 is a schematic cross-sectional view of a damper integral type differential pressure piston type starting clutch 300 according to a second embodiment of the present invention. This is an embodiment in which a portion of the housing of the starting clutch 200 according to the first embodiment is changed and a damper device 301 is incorporated in the housing. The damper device 301 is disposed inside the housing of the starting clutch 200, and is connected to the outer peripheral cylindrical portion 303 of a clutch case 302 by a spline or the like.

The damper device 301 comprises a cylindrical portion 312 coupled to the outer peripheral cylindrical portion 303 by a spline, a plurality of hub plates 311 radially outwardly extending integrally with the cylindrical portion, and a plurality of damper springs 310 provided among the hub plates 311.

Even if the damper device is incorporated, the operation and function of the differential pressure piston type starting clutch are established without being affected thereby. Of course, the operation and function are established. even if the damper device is any other damper device than that of the present embodiment, and the power transmitting route and the flow of oil in the present embodiment are the same as those in the first embodiment and therefore need not be described here.

FIG. 3 also diagrammatically illustrates an oil pressure control mechanism 314. This mechanism will be addressed in further detail later.

Figure 4:
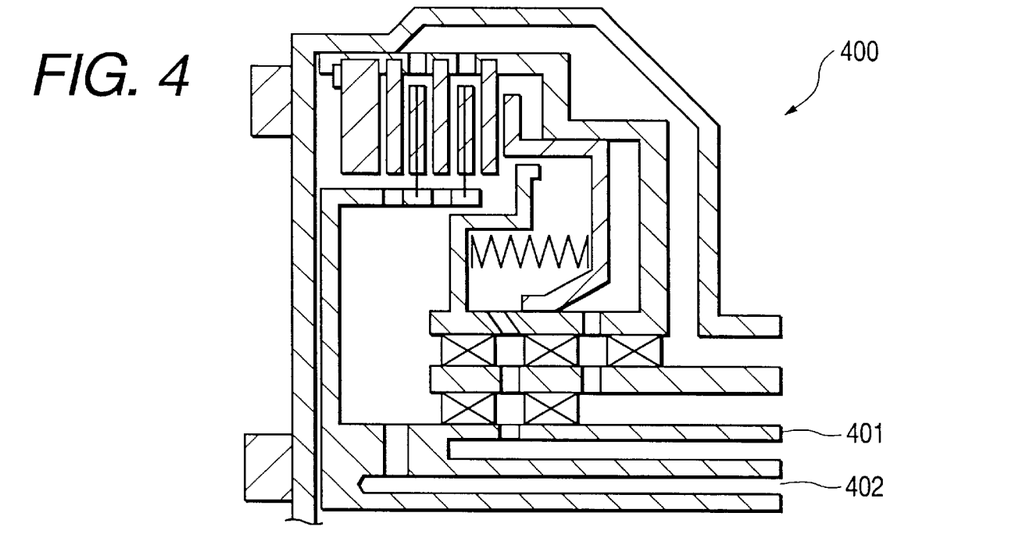
FIG. 4 is a schematic cross-sectional view of an oil pressure vs. oil pressure type starting clutch according to a third embodiment of the present invention.
Figure 5:
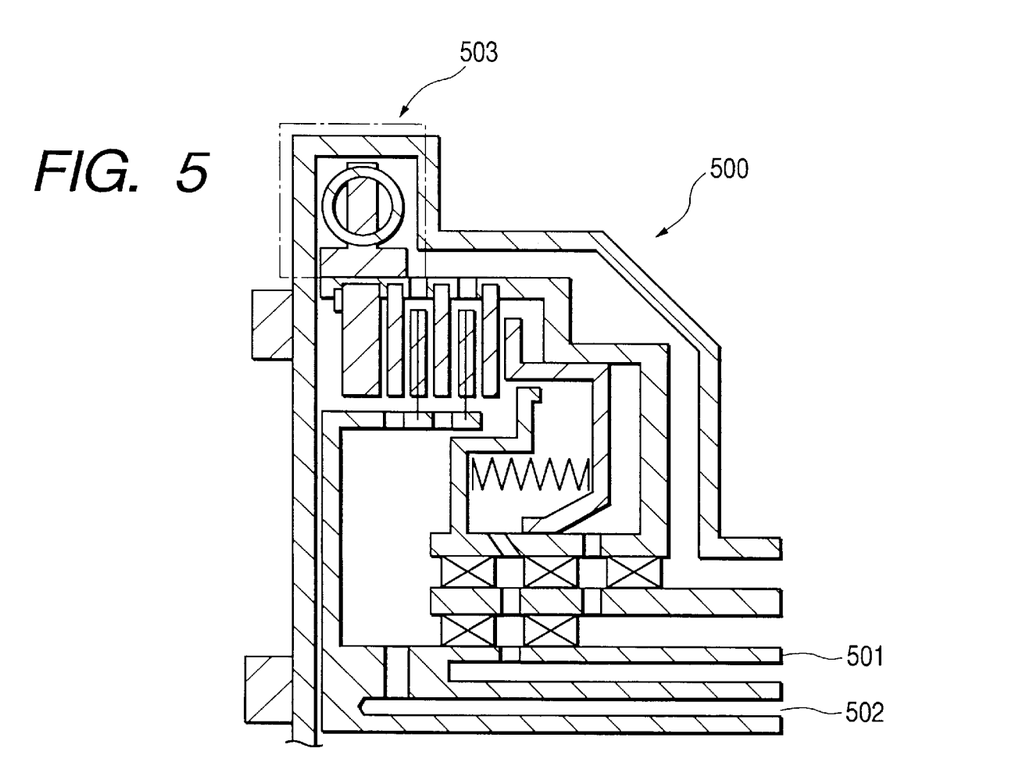
FIG. 5 is a schematic cross-sectional view of a damper integral type starting clutch according to a fourth embodiment of the present invention.

FIG. 4 is a schematic cross-sectional view showing an oil pressure vs. oil pressure type starting clutch 400 according to a third embodiment of the present invention, and FIG. 5 is a schematic cross-sectional view showing a damper integral type starting clutch 500 according to a fourth embodiment of the present invention in which a damper device 503 similar to the damper device 301 is added to the third embodiment. As seen in the drawings, the first bore 402 or 502 in these embodiments is open at only one end.

Figure 6:
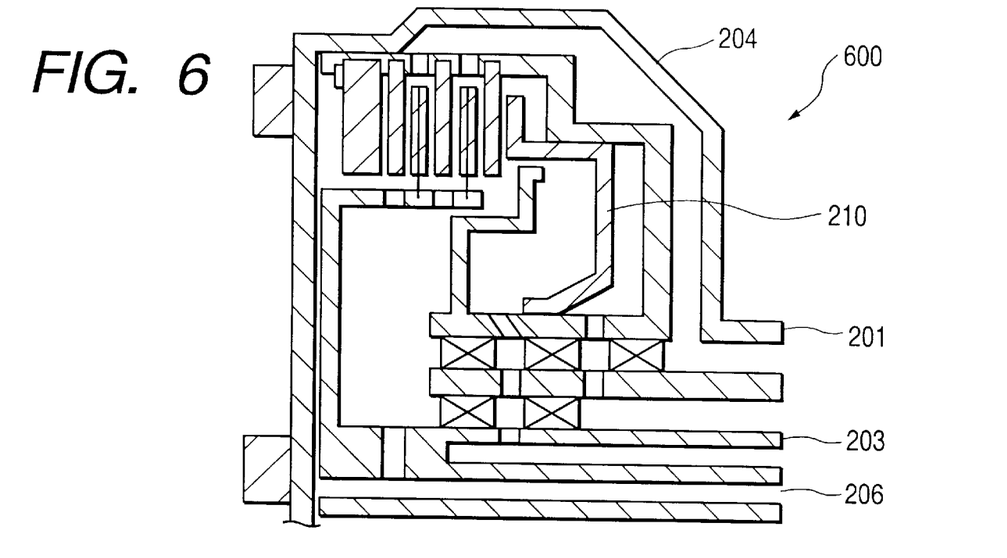
FIG. 6 is a schematic cross-sectional view of an oil pressure vs. oil pressure type starting clutch according to a fifth embodiment of the present invention.

FIG. 6 is a schematic cross-sectional view showing an oil pressure vs. oil pressure type starting clutch 600 according to a fifth embodiment of the present invention in which the coil spring 217 for pushing back the clutch piston in the first embodiment to the liberating side is eliminated.

Figure 7:
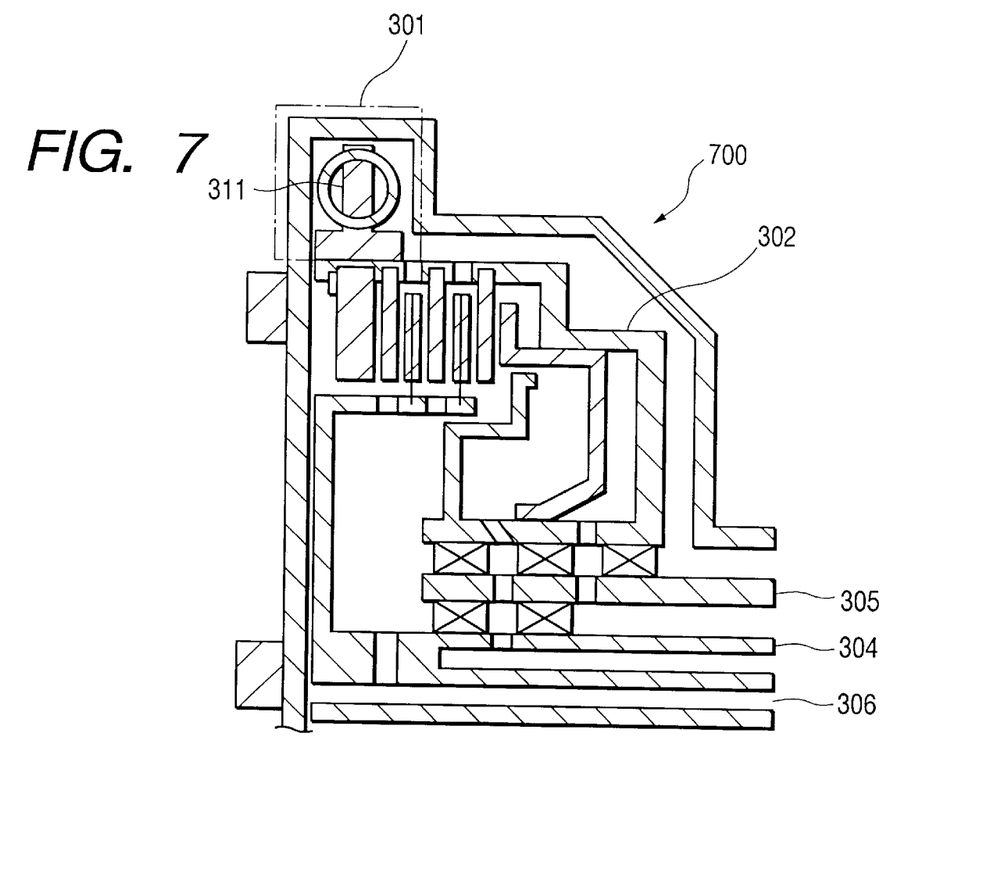
FIG. 7 is a schematic cross-sectional view of a damper integral type starting clutch according to a sixth embodiment of the present invention.

FIG. 7 is a schematic cross-sectional view showing a damper integral type starting clutch 700 according to a sixth embodiment of the present invention in which the coil spring for pushing back the clutch piston in the second embodiment to the liberating side is eliminated.

Figure 8:
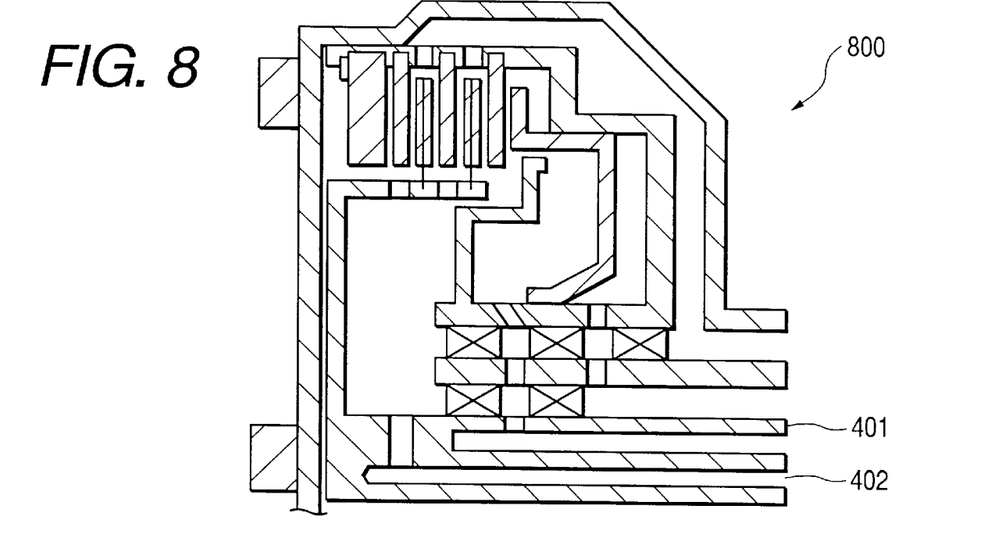
FIG. 8 is a schematic cross-sectional view of an oil pressure vs. oil pressure type starting clutch according to a seventh embodiment of the present invention.

FIG. 8 is a schematic cross-sectional view showing an oil pressure vs. oil pressure type starting clutch 800 according to a seventh embodiment of the present invention in which the coil spring for pushing back the clutch piston in the third embodiment to the liberating side is eliminated.

Figure 9:
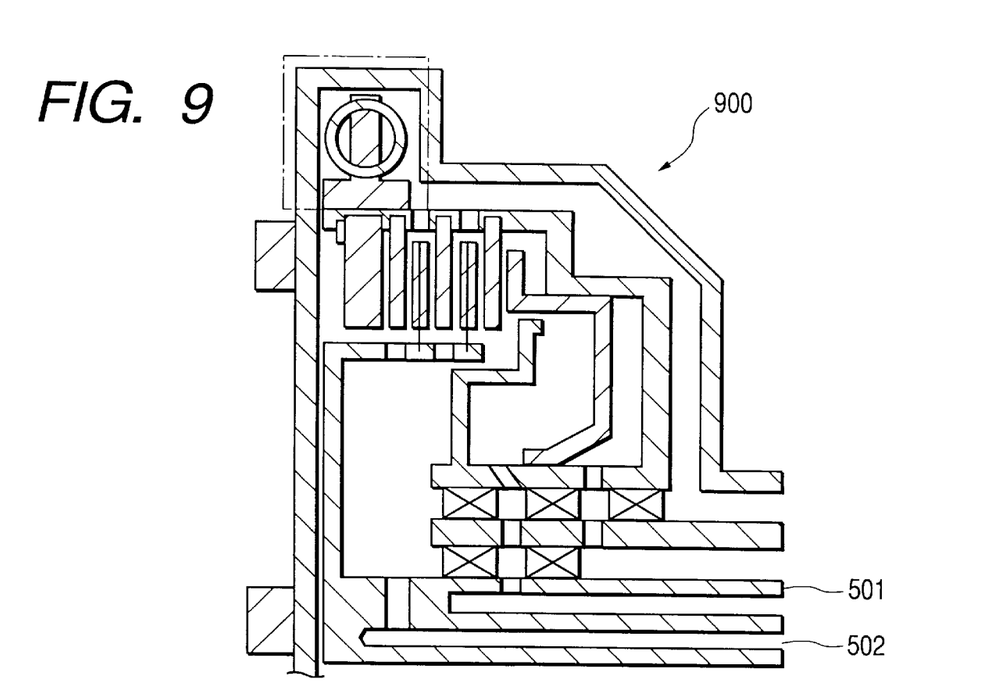
FIG. 9 is a schema tic cross-sectional view of a damper integral type starting clutch according to an eighth embodiment of the present invention.

FIG. 9 is a schematic cross-sectional view showing a damper integral type starting clutch 900 according to an eighth embodiment of the present invention in which the coil spring for pushing back the clutch piston in the fourth embodiment to the liberating side is eliminated.

Even though in the fifth to eighth embodiments shown in FIGS. 6 to 9, the coil springs are eliminated, the fastening and liberation of the clutch can be freely controlled by oil pressure.

The third embodiment differs from the aforedescribed first and second embodiments in that the inner hole 402 formed axially of the input shaft 401 does not extend through the input shaft. Likewise, in the fourth embodiment, the inner hole 502 formed axially of the input shaft 501 does not extend through the input shaft. The power transmitting route, the flow of oil, the function, etc. in the third embodiment and the fourth embodiment are the same as those in the first embodiment and the second embodiment and therefore need not be described here.

With the second embodiment previously described in detail and shown in FIG. 3 as an illustrative one, brief description will be made of a mechanism for controlling the oil pressure in the clutch fastening oil path of the starting clutch of the present invention and the oil pressure in the clutch liberating oil path.

A first oil pressure control line 320 is connected to a second inner hole 307 axially extending parallel to a first inner hole 306 formed in the input shaft 304 and communicating with a clutch liberating oil path H. A second oil pressure control line 321 is connected to a gap 313 defined between the input shaft 304 and the fixed shaft 305 and communicating with a clutch fastening oil path G.

The first and second oil pressure control lines 320 and 321 are connected to an oil pressure control unit 314. The oil pressure control unit 314 controls the oil pressure to be sent to the first and second oil pressure control lines 320 and 321, on the basis of the information of the automatic transmission body or the like, and gives an appropriate oil pressure state to the clutch liberating oil path H and the clutch fastening oil path G, thus effecting the fastening and liberation of the clutch.

Of course, the oil pressure control unit having such a function can likewise be provided in other embodiments.

The starting clutch of the present invention can be applied not only to conventional automatic transmissions (A/T), but equally to other power transmitting mechanisms, for example, a continuously variable transmission such as CVT.

Figure 10A:
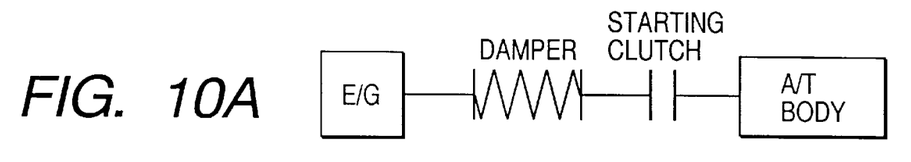
FIGS. 10A, 10B, 10C, 10D and 10E illustrate that the starting clutch of the present invention can be disposed at any location between an engine and a transmission body such as an automatic transmission.
Figure 10B:
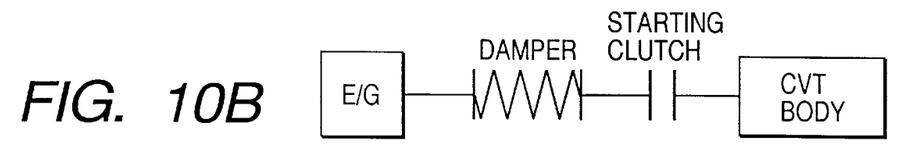
Figure 10C:
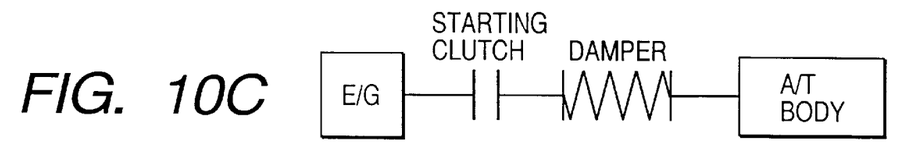
Figure 10D:
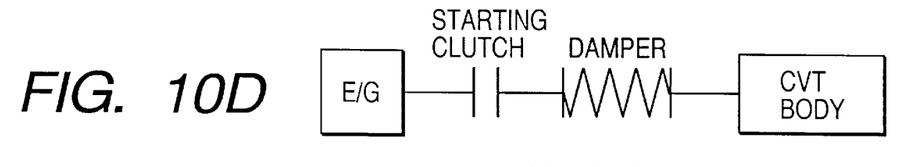
Figure 10E:
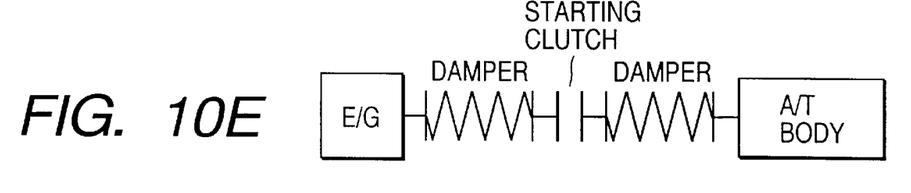

FIGS. 10A to 10E illustrate that the starting clutch of the present invention can be disposed at any location between an engine and a transmission body such as an automatic transmission. In FIG. 10A, the starting clutch connected to an engine (E/G) through a damper is connected to an ordinary automatic transmission (A/T) body. In FIG. 10B, the starting clutch connected to the engine (E/G) through the damper is connected to a continuously variable transmission (CVT) body. In FIG. 10C, conversely to FIG. 10A, the starting clutch connected to the engine is connected to an automatic transmission body through the damper. In FIG. 10D, conversely to FIG. 10B, the starting clutch connected to the engine is connected to a continuously variable transmission body through the damper. In FIG. 10E, the starting clutch connected to the engine through the damper is connected to an automatic transmission body through another damper. Of course, in FIG. 10E, it is possible to replace the automatic transmission by a continuously variable transmission.

Also, of course, the starting clutch according to the first embodiment of the present invention can be used in the case of any of the combinations of FIGS. 10A to 10E.

According to the oil pressure circuit of the above-described starting clutch of the present invention, there are obtained the following effects:

(1) As compared with the operation of the clutch piston in the prior art, particularly the liberation of the clutch, by the reaction force of a coil spring, the positive liberation of the clutch piston by the oil pressure can be achieved quickly and at high accuracy with the construction of the starting clutch being almost unchanged.

(2) The pressure difference between the fastening oil pressure and the liberating oil pressure can be arbitrarily set to thereby freely control the power transmission rate of the starting clutch from nearly 0% to 100%.

(3) Even if centrifugal oil pressure occurs on the fastening oil pressure side of the clutch piston, it is possible to cancel the centrifugal oil pressure by raising the liberating oil pressure by an amount corresponding to the centrifugal oil pressure.

(4) Also, according to the embodiments in which a coil spring is installed on the liberating oil pressure side and is used jointly with the liberating side oil pressure force, when oil pressure is not operating immediately after the starting of the engine, it is possible to prevent the starting clutch from being fastened and thereby causing the automobile to run out, an engine failure or the Like.

What is claimed is:

1. An oil pressure circuit in a starting clutch for a power transmission mechanism, said starting clutch having an input shaft, a shaft member disposed radially outwardly of said input shaft, a clutch case disposed radially outwardly of said shaft member and containing a clutch portion., a clutch piston and an annular member therein, and a housing containing said clutch case therein, said oil pressure circuit comprising:

a cooling oil path disposed between a first inner hole, provided axially in said input shaft, and said clutch portion, said cooling oil path supplying oil for cooling a friction surface of said clutch portion;

a clutch liberating oil path defined from a second inner hole, provided radially outwardly of said first inner hole and axially in said input shaft, and between said clutch piston and said annular member, said clutch liberating oil path supplying oil to press said clutch piston to liberate said clutch portion;

a clutch fastening oil path defined from a gap of said input shaft and said shaft member, and between said clutch case and said clutch piston, said clutch fastening oil path supplying oil to press said clutch piston to fasten said clutch portion; and a drain oil path defined between said shaft member and said housing and between said clutch case and said housing, said drain oil path discharging the cooling oil which has cooled said friction surface, wherein said cooling oil path and said drain oil path are provided independently of said clutch liberating oil path and said clutch fastening oil path, respectively.

2. An oil pressure circuit in a starting clutch according to claim 1, characterized in that said first inner hole extends axially through said input shaft.

3. An oil pressure circuit in a starting clutch according to claim 1, characterized in that said first inner hole does not extend axially through said input shaft.

4. An oil pressure circuit in a starting clutch according to claim 1, characterized in that said starting clutch is coupled to a damper.

5. An oil pressure circuit in a starting clutch according to any one of claims 1 to 4, characterized in that said starting clutch is incorporated in a power transmitting route wherein an engine, a damper, the starting clutch and an automatic transmission are connected in the named order.

6. An oil pressure circuit in a starting clutch according to any one of claims 1 to 4, characterized in that said starting clutch is incorporated in a power transmitting route wherein an engine, the starting clutch, a damper and an automatic transmission are connected in the named order.

7. An oil pressure circuit in a starting clutch according to any one of claims 1 to 4, characterized in that said starting clutch is incorporated in a power transmitting route wherein an engine, a damper, the starting clutch, a damper and an automatic transmission are connected in the named order.

8. An oil pressure circuit in a starting clutch according to any one of claims 1 to 4, characterized in that a spring is provided in said clutch liberating oil path and gives a force which urges said clutch piston in a direction to liberate said clutch portion.

9. An oil pressure circuit in a starting clutch according to claim 5, characterized in that a spring is provided in said clutch liberating oil path and gives a force which urges said clutch piston in a direction to liberate said clutch portion.

10. An oil pressure circuit in a starting clutch according to claim 6, characterized in that a spring is provided in said clutch liberating oil path and gives a force which urges said clutch piston in a direction to liberate said clutch portion.

11. An oil pressure circuit in a starting clutch according to claim 7, characterized in that a spring is provided in said clutch liberating oil path and gives a force which urges said clutch piston in a direction to liberate said clutch portion.

12. An oil pressure circuit in a starting clutch according to any one of claims 1 to 4, characterized in that fastening and liberation of said clutch portion are effected by use of said clutch fastening oil path and said clutch liberating oil path, such that control of said clutch piston is effected by oil pressure alone.

13. An oil pressure circuit in a starting clutch according to claim 5, characterized in that fastening and liberation of said clutch portion are effected by use of said clutch fastening oil path and said clutch liberating oil path, such that control of said clutch piston is effected by oil pressure alone.

14. An oil pressure circuit in a starting clutch according to claim 6, characterized in that fastening and liberation of said clutch portion are effected by the use of said clutch fastening oil path and said clutch liberating oil path, such that control of said clutch piston is effected by oil pressure alone.

15. An oil pressure circuit in a starting clutch according to claim 7, characterized in that fastening and liberation of said clutch portion are effected by the use of said clutch fastening oil path and said clutch liberating oil path, such that control of said clutch piston is effected by oil pressure alone.

16. An oil pressure circuit in a starting clutch according to claim 4, characterized in that said damper intervenes between said housing and said clutch case.

17. An oil pressure circuit in a starting clutch according to claim 4, characterized in that said damper is connected to an outer peripheral cylinder portion of said clutch case.

18. An oil pressure circuit in a starting clutch according to claim 16, characterized in that said damper is connected to an outer peripheral cylinder portion of said clutch case.

19. A starting clutch for a power transmission mechanism, comprising an input shaft, a shaft member disposed radially outwardly of said input shaft, a clutch case disposed radially outwardly of said shaft member and containing a clutch portion, a clutch piston and an annular member therein, and a housing containing sail clutch case therein, said input shaft and said shaft member bounding a plurality of passages displaced from each other radially of said starting clutch and extending axially of said starting clutch, said starting clutch having an oil pressure circuit including:

a cooling oil path communicating between a first of said passages and said clutch portion to supply oil for cooling a friction surface of said clutch portion;

a clutch liberating oil path communicating between a second of said passages and a space between said clutch piston and said annular member to supply oil to press said clutch piston to liberate said clutch portion;

a clutch fastening oil path communicating between a third of said passages and a space between said clutch case and said clutch piston to supply oil to press said clutch piston to fasten said clutch portion; and a drain oil path communicating between said clutch portion and a space between said clutch case and said housing to discharge oil from said cooling oil path which has cooled said friction surface, wherein said cooling oil path and said drain oil path are provided independently of said clutch liberating oil path and said clutch fastening oil path, respectively.

20. A starting clutch according to claim 19, characterized in that said first passage is disposed radially inwardly from said second and third passages, and said second passage is disposed radially inwardly from said third passage.

21. A starting clutch according to claim 20, characterized in that said first passage extends axially through said input shaft.

22. A starting clutch according to claim 20, characterized in that said first passage extends axially within said input shaft without passing therethrough.

23. A starting clutch according to claim 19, and which is coupled to a damper.

24. A starting clutch according to claim 23, characterized in that said damper intervenes between said housing and said clutch case.

25. A starting clutch according to claim 24, characterized in that said damper is connected to an outer peripheral cylinder portion of said clutch case.

26. A starting clutch according to claim 23, characterized in that said damper is connected to an outer peripheral cylinder portion of said clutch case.

27. A starting clutch according to any one of claims 19–23, characterized in that a spring is provided in said clutch liberating oil path and gives a force which urges said clutch piston in a direction to liberate said clutch portion.

28. A starting clutch according to claim 27, characterized in that said spring intervenes between said clutch piston and a radially extending portion of said clutch case.

29. A combination including a starting clutch according to any one of claims 19–23 and a control device which controls relative oil pressures of said clutch fastening oil path and said clutch liberating oil path to effect fastening and liberation of said clutch portion.

30. The combination according to claim 29, characterized in that a fastening force and a liberating force on said clutch piston are generated solely by oil pressure.

31. The combination according to claim 29, characterized in that a spring is provided in said clutch liberating oil path and gives a force which urges said clutch piston in a direction to liberate said clutch portion.

32. An oil pressure circuit in a starting clutch according to claim 17, characterized in that said damper includes a hub fitted into a spline provided on said outer peripheral cylinder portion of said clutch case and having a radially outwardly extending portion, said housing has a cavity in which said hub is accommodated, and a spring intervenes between parts of said extending portion of said hub in said cavity.

33. An oil pressure circuit in a starting clutch according to claim 18, characterized in that said damper includes a hub fitted into a spline provided on said outer peripheral cylinder portion of said clutch case and having a radially outwardly extending portion, said housing has a cavity in which said hub is accommodated, and a spring intervenes between parts of said extending portion of said hub in said cavity.

* * * * *